(12) United States Patent
Scandroglio (10) Patent No.: US 9,095,909 B2
(45) Date of Patent: Aug. 4, 2015

(54) CUTTING TOOL AND AN INSERT HOLDER FOR A CUTTING TOOL

(75) Inventor: Emilio Scandroglio, Legnano (IT)

(73) Assignee: Seco Tools AB, Fagersta (SE)

( * ) Notice: Subject to any disclaimer, the term of this patent is extended or adjusted under 35 U.S.C. 154(b) by 452 days.

(21) Appl. No.: 13/266,464

(22) PCT Filed: Apr. 21, 2010

(86) PCT No.: PCT/SE2010/050437
§ 371 (c)(1),
(2), (4) Date: Nov. 2, 2011

(87) PCT Pub. No.: WO2010/126430
PCT Pub. Date: Nov. 4, 2010

(65) Prior Publication Data
US 2012/0051853 A1 Mar. 1, 2012

(30) Foreign Application Priority Data
Apr. 30, 2009 (SE) ........................ 0900587

(51) Int. Cl.
*B23C 5/22* (2006.01)
*B23B 27/16* (2006.01)

(52) U.S. Cl.
CPC ........... *B23B 27/1611* (2013.01); *B23C 5/2221* (2013.01); *B23B 2200/0461* (2013.01); *B23B 2200/125* (2013.01); *B23B 2200/3627* (2013.01); *B23B 2205/12* (2013.01); *Y10T 407/1934* (2015.01); *Y10T 407/2268* (2015.01)

(58) Field of Classification Search
CPC ....................................... B23C 5/22
USPC ............ 407/113, 101–104, 35, 43, 47, 48, 99
See application file for complete search history.

(56) References Cited

U.S. PATENT DOCUMENTS

| 4,679,968 | A | * | 7/1987 | Tsujimura et al. | 407/114 |
| 5,346,336 | A | * | 9/1994 | Rescigno | 407/104 |
| 5,779,401 | A | * | 7/1998 | Stallwitz et al. | 407/114 |
| 6,004,081 | A | * | 12/1999 | Hellstrom et al. | 407/103 |
| 6,017,171 | A | * | 1/2000 | Karlsson | 407/34 |
| 6,164,878 | A | * | 12/2000 | Satran et al. | 407/113 |
| 6,234,724 | B1 | * | 5/2001 | Satran et al. | 407/43 |

(Continued)

FOREIGN PATENT DOCUMENTS

| EP | 0300172 | | 1/1989 |
| WO | 9700750 | A1 | 1/1997 |
| WO | 0023218 | A1 | 4/2000 |

OTHER PUBLICATIONS

International Search Report for corresponding International Application PCT/SE2010/050437.

*Primary Examiner* — Sunil K Singh
*Assistant Examiner* — Sara Addisu
(74) *Attorney, Agent, or Firm* — WRB-IP LLP (57) ABSTRACT

A cutting tool has an indexable insert, a holder with a holder member and an arrangement for securing the insert to the holder. An upstanding holder wall and a conical insert clearance surface are designed so as to enable securing of the insert to the holder in a finite number of fixed relative positions. A curved portion of the upstanding holder wall supports the conical clearance surface laterally in each fixed relative position of the holder and the insert. A tight abutment of the conical clearance surface on said curved portion is provided to dirt from penetrating therebetween.

16 Claims, 4 Drawing Sheets

(56) References Cited

U.S. PATENT DOCUMENTS

| | | | |
|---|---|---|---|
| 6,238,133 B1* | 5/2001 | DeRoche et al. | 403/359.1 |
| 6,540,448 B2* | 4/2003 | Johnson | 407/35 |
| 6,607,334 B2* | 8/2003 | Satran et al. | 407/35 |
| 6,796,750 B2* | 9/2004 | Men | 407/35 |
| 6,884,006 B2* | 4/2005 | Nagashima | 407/34 |
| 7,255,518 B2* | 8/2007 | Wallstrom et al. | 407/103 |
| 7,390,149 B2* | 6/2008 | Wihlborg | 407/35 |
| 7,549,824 B2* | 6/2009 | Agic | 407/42 |
| 7,722,297 B2* | 5/2010 | Dufour et al. | 407/66 |
| 7,908,945 B2* | 3/2011 | Dufour et al. | 82/1.11 |
| 8,147,171 B2* | 4/2012 | Dufour et al. | 407/113 |
| 8,162,572 B2* | 4/2012 | Festeau et al. | 407/113 |
| 8,206,066 B2* | 6/2012 | Men et al. | 407/113 |
| 8,454,277 B2* | 6/2013 | Dudzinsky et al. | 407/67 |
| 8,459,904 B2* | 6/2013 | de Souza Filho et al. | 407/11 |
| 2002/0168235 A1 | 11/2002 | Johnson | |
| 2004/0028486 A1* | 2/2004 | Englund | 407/90 |

\* cited by examiner

CUTTING TOOL AND AN INSERT HOLDER FOR A CUTTING TOOL

BACKGROUND AND SUMMARY

The present invention relates to a cutting tool comprising at least one indexable insert having a top chip breaking surface, a bottom mounting surface and a conical clearance surface extending between said top and bottom surfaces and intersecting said top surface to form therewith a cutting edge with a substantially circular extension, said insert comprising at least one flat lower portion such that a cross-section in a plane through the indexable insert parallel to the bottom mounting surface intersects both said flat lower portion and said conical clearance surface, said indexable insert having a centre, a holder comprising at least one holder member having a bottom surface forming a seat for supporting said bottom surface of said insert and an upstanding wall forming part of a cone configured to form a lateral support for said insert, said holder member comprising at least one flat lower portion such that bordering edges of the holder member when seen in the plane of a said insert received in the holder member parallel to the bottom surface contain both said flat lower portion and said upstanding wall, and means for securing said insert to said holder, said upstanding holder wall and said insert clearance surface are designed so as to enable securing of said insert to said holder in a finite number of fixed relative positions, as well as an insert holder for such a cutting tool.

The invention relates to cutting tools for chip removing machining in general, such as for example turning or milling, but since it is particularly directed to milling in the form of difficult roughing machining, such as of turbine blades, such a cutting tool for milling will hereinafter mainly be described for illuminating, but accordingly not restricting the invention thereto.

The holder of a cutting tool of this type may have a plurality of holder members each holding a said insert for alternatively or simultaneously machining a work piece by the cutting edges of the inserts.

The respective insert will then be securely held in the holder by securing means in a said fixed relative position until the part of the cutting edge used in the machining operation is worn out or otherwise fails, such as is broken, whereupon said securing means is released for moving the insert with respect to the holder for putting it in a new position in the holder, i.e. indexed, for securing the insert in such a new fixed relative position with respect to the holder for utilising another part of the cutting edge of the insert.

Important properties of such a cutting tool are high stability of the seat of the insert in the holder member in a said fixed relative position, i.e. firmly clamping of the insert to said holder in this position, efficient heat dissipation from the insert and easiness to carry out the indexing operation, especially to find a new said fixed relative position. The two properties first mentioned are of particularly vital importance when the working tool is designed for machining of work pieces being difficult to machine for any reason, which means that considerable forces will be applied to the insert and the generation of heat will be at a high level.

A cutting tool of the type defined in introduction is known through for example U.S. Pat. No. 5,346,336. The upstanding holder wall of a holder member of that cutting tool is formed by two flat sides or parts making an obtuse angle with each other, and these two flat sides co-operate with two mutually spaced flat lower portions in the lower part of the clearance surface of the insert for defining a said fixed relative position when the insert is secured in the holder member by tightening a screw. Thus, contact between the insert and the holder member is established mainly only through said flat lower insert portions bearing on said flat holder wall sides. Although this cutting tool provides a stability of the seat of the insert in the holder member and an ability to dissipate heat from the insert which may be acceptable for some type of machining, it may be desired to improve these properties as well as the property of easiness and reliability of indexing.

The object of the present invention is to provide a cutting tool of the type defined in the introduction being improved with respect to at least one of the properties mentioned above compared with such cutting tools already known.

This object is according to the invention obtained by providing such a cutting tool which is further characterized in that in each said relative position in said plane a first distance between the centre and the lower portion of the insert is less than a second distance between the centre and the lower portion of the holder member, which in turn is less than a third distance between the centre and the conical clearance surface and a curved portion of the upstanding wall laterally supporting said conical clearance surface.

The fact that said first distance is less than said second distance means that when the insert is secured in a said fixed relative position with the bottom surface thereof resting on the bottom surface of the holder member there will be a gap between the lower portion of the upstanding holder wall and the corresponding lower portion of the insert facing the lower portion first mentioned. This means that larger tolerances when manufacturing the insert and the holder member may be tolerated and still a perfect fit of these with respect to each other be obtained then would there be no such gap between said lower portions. This also means that it gets easier to obtain a real perfect tight abutment of said conical clearance surface on said curved portion, since there is no need of a perfect match of said lower portions with respect to each other. This contributes to efficient heat dissipation from insert to holder and prevents chips or dirt to penetrate between said curved portion and conical clearance surface.

According to an embodiment of the invention an upper part of said upstanding holder wall makes substantially the same angle with said bottom surface of the holder member as an angle made by an upper part of said insert clearance surface with said bottom surface of the insert for tight abutment of said upper part of the insert to said upper part of the holder member over the entire circumferential extension of said upstanding holder wall when the insert is secured to said holder.

By designing the holder member of the holder to have an upper part corresponding to the upper part of an insert to be held therein for obtaining said tight abutment of these upper parts over the entire circumferential extension of the upstanding holder wall a perfect mutual contact of the insert clearance surface and the upstanding holder wall is obtained with no possibility for chips or other dirt to penetrate therebetween and disturb this contact. This means that heat dissipation from the insert to the holder will be very efficient. Furthermore, this tight abutment over the entire circumferential extension of the upstanding holder wall contributes to a high stability of the seat of the insert in the holder member.

According to another embodiment of the invention the holder member is configured to receive said insert with said at least one lower portion of the upstanding holder wall facing said at least one lower portion of the insert clearance surface in each said fixed relative position, and said at least one lower portion of the upstanding holder wall and said at least one lower portion of the insert clearance surface are designed to have a gap therebetween over the entire extension of these lower portions when said upper part of the insert clearance surface bears tightly upon the upper part of the upstanding holder wall and these lower portions are facing each other in each said fixed relative position.

According to another embodiment of the invention said at least one lower portion of the upstanding holder wall makes a smaller obtuse angle with respect to the bottom surface of the holder member then the obtuse angle made by said at least one lower portion of the insert clearance surface so as to define said gap, and that the difference the obtuse angles made by said at least one lower portion of the upstanding holder wall with the bottom surface of the holder and said at least one lower portion of the insert clearance surface with the bottom surface of the insert is 1°-20°, especially 1.5°-5°. This is a suitable possible way to obtaining said preferred gap resulting in no mutual contact of the lower portion of the upstanding holder wall and the corresponding lower portion of the insert facing the lower portion first mentioned, but other favourable ways of obtaining this are also envisaged, such as making a local recess in the upstanding holder wall below said upper part thereof and then have the lower portion of this holder wall extending at a substantially constant distance to the lower portion of the insert. When choosing the option of different said obtuse angles the magnitude of the angle difference may be chosen so that it is ensured that there is no risk of abutment while preferably keeping this difference as small as possible for facilitating proper definition of said fixed relative positions.

According to another embodiment of the invention said at least one lower portion of the upstanding holder wall extends over a restricted part of the circumferential extension of the upstanding holder wall, and the insert has a plurality of said lower portions spaced apart over the circumferential extension of the insert clearance surface and each extending over a corresponding restricted part of the circumferential extension of the insert clearance surface so as to define said fixed relative positions when facing said at least one lower portion of the upstanding holder wall for indexing between such positions. This constitutes a preferred and efficient way of defining said fixed relative positions for indexing of the insert.

According to another embodiment of the invention said at least one lower portion of the upstanding holder wall makes a larger obtuse angle, such as 3°-15° or 5°-10° larger, with said bottom surface of the holder than made by said upper part of said upstanding holder wall with this bottom surface. It may by this by simple means be obtained that only said upper part of the upstanding holder wall bears upon the insert clearance surface where a said lower portion is located.

According to another embodiment of the invention said upstanding holder wall has more than one said lower portion, and the mutual angular spacing of these lower portions is the same as a mutual angular spacing of corresponding lower portions in the lower part of said insert clearance surface. By having more than one said lower portion of the upstanding holder wall said fixed relative positions may be very reliably defined and easily obtained.

According to another embodiment of the invention said lower portions of the upstanding holder wall are separated by lower upstanding holder wall parts making a smaller obtuse angle, such as 3°-15° or 5°-10° smaller, with said bottom surface of the holder member than the obtuse angle made by said lower portions of that wall with said bottom surface, and said lower portions of the insert are separated by a lower insert clearance surface part making a smaller obtuse angle with said bottom surface of the insert than made by said lower portions of the insert with this bottom surface. The presence of these lower upstanding holder wall parts separating the lower portions of the upstanding holder wall makes indexing very easy to carry out, since it will be impossible to put the insert in another position than in a said fixed relative position with respect to the holder member, since it will only fit with the bottom surface onto the bottom surface of the holder member with the lower portions thereof facing lower portions of the upstanding holder wall. These features make it impossible to put the insert and secure it otherwise than in a said fixed relative position in the holder member.

According to another embodiment of the invention said lower portions of the upstanding holder wall and of the insert clearance surface are flat.

According to another embodiment of the invention the upstanding holder wall has two said lower portions, and said insert has suitably 2, 3, 4, 5, 6, 7 or 8 said lower portions of the insert clearance surface. The number of such lower portions may depend upon for which type of machining the cutting tool is intended, which decides the number of preferred possible fixed relative positions for indexing, and 4 is a typical such number.

According to another embodiment of the invention said upper part of said upstanding holder wall extends over 10-50% of the vertical extension of the upstanding holder wall from the top thereof to said bottom surface and preferably over 10-30% of this extension. This results in a suitable size of the area of perfect contact between the insert and the holder member.

According to another embodiment of the invention said upstanding holder-wall has a circumferential extension of 90°-270°, preferably 120°-200°. An increasing such circumferential extension may increase the stability of the seat of the insert in the holder member and also the heat dissipation ability.

According to another embodiment of the invention the cutting tool comprises a plurality of said inserts and holder members distributed on the holder around an intended axis of rotation of the holder, which may be preferred when the cutting tool is used for milling.

The invention also relates to an insert holder for holding at least one insert in a cutting tool, and this insert holder is designed as the holder defined in any of the embodiments described above of a cutting tool according to the present invention. The advantages and advantageous features of such a holder appear clearly from the above discussion of the cutting tool according to the present invention.

Further advantages as advantageous features of the invention appear from the following description.

BRIEF DESCRIPTION OF THE DRAWINGS

With reference to the appended drawings, below follows a specific description of cutting tools and insert holders according to embodiments of the invention.

In the drawings.

DETAILED DESCRIPTION OF EMBODIMENTS OF THE INVENTION

Figure 1:
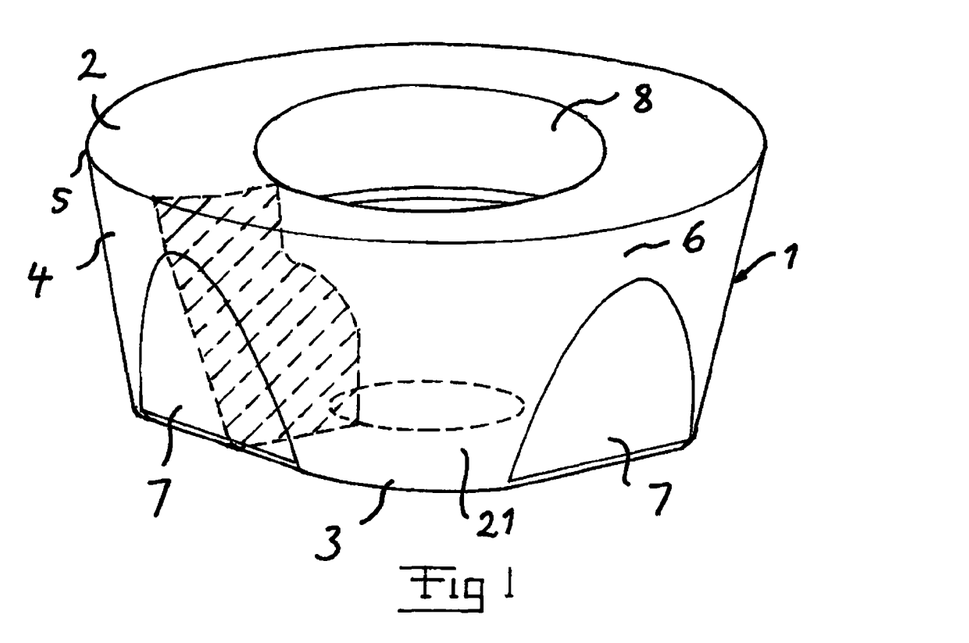
FIG. 1 is a perspective view of an insert for a cutting tool according to an embodiment of the present invention.
Figure 2:
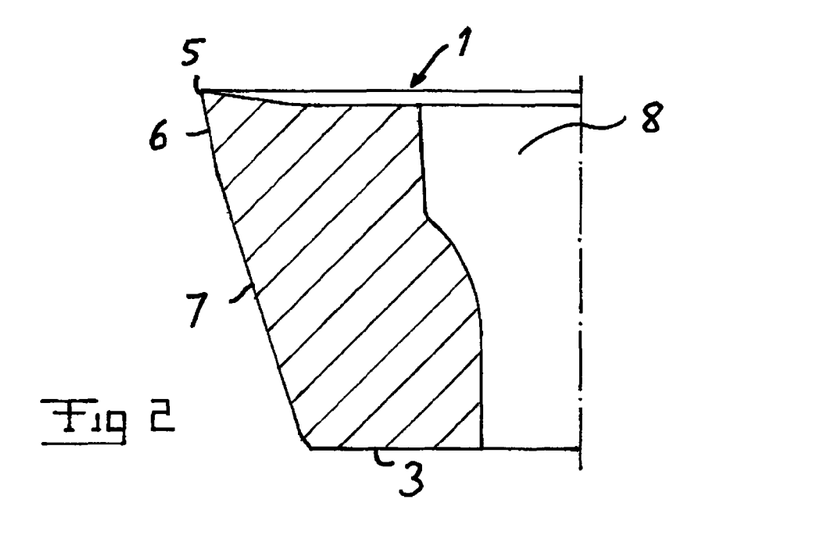
FIG. 2 is a cross-section view of a part of the insert according to FIG. 1.

FIG. 1 shows an indexable insert 1 to be used in a cutting tool according to the present invention. The insert has a top chip breaking surface 2, a bottom mounting surface 3 and a clearance surface 4 extending between said top and bottom surfaces and intersecting said top surface 2 to form therewith a cutting edge 5 with a substantially circular extension. This cutting edge may be used for different types of chip removing machining, such as turning or milling.

The insert has a frusto-conical shape with an angle of 90°+A (see FIG. 3) made by the upper part 6 thereof and also partially 21 in the lower part of the clearance surface thereof with said bottom surface 3. A is in the embodiment shown 11°. However, the lower part of the insert clearance surface following upon said upper part thereof as seen in the direction towards the bottom surface 3 has four lower portions 7 spaced apart over the circumferential extension of the insert clearance surface and each extending over a corresponding restricted part of the circumferential extension of the insert clearance surface. These lower portions 7 are uniformly distributed around the insert clearance surface and each of them extends over about 71-79% of the vertical extension of the clearance surface. Each lower portion 7 is flat and makes a larger angle of 90°+B with said bottom surface 3 than the angle 90°+A made by said upper part of the clearance surface. B is in the present case about 18°. The insert has also a central through-hole 8 for receiving a screw for securing the insert to an insert holder of the cutting tool in a way to be explained further below.

The insert may be made of any material having mechanical properties required for the operation of such an insert. It may be made from a hard, wear-resistant material, preferably cemented carbide, but may alternatively be of ceramics or cubic boron nitride (CBN). The most common hard material in cemented carbide is wolfram carbide, WC, and a binder metal. Alternative carbides may be of the metals titanium (TiC), tantalum (TaC) and niobium (NbC). The most common binder metal is cobalt (Co) but also nickel (Ni) is possible. The cemented carbide is a powder mixture built up by carbide particles having a grain size of 0.5-10 µm and a binder metal. The percentage by volume of the binder metal is 5-40% and the percentage by volume of the carbides is 95-60%. The insert may be coated with a layer of e.g. $Al_2O_3$, TiN and/or TiCN.

Figure 3:
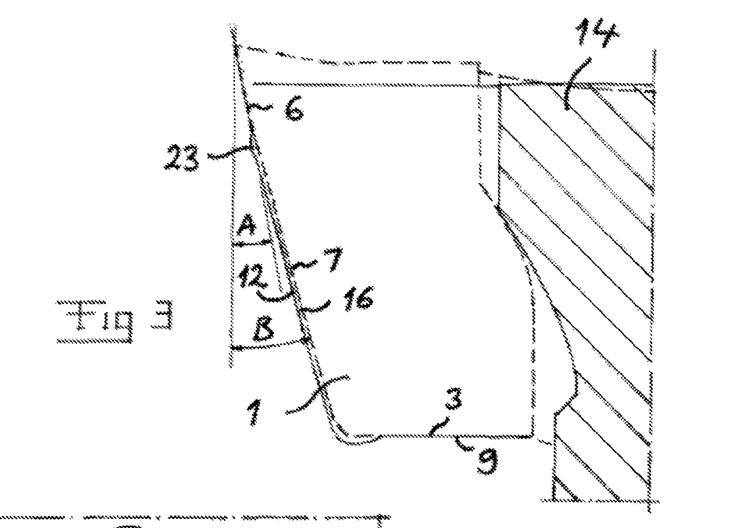
FIG. 3 is a simplified partially sectioned view illustrating how the insert according to FIG. 1 is secured in a holder member of a cutting tool according to the invention.
Figure 4:
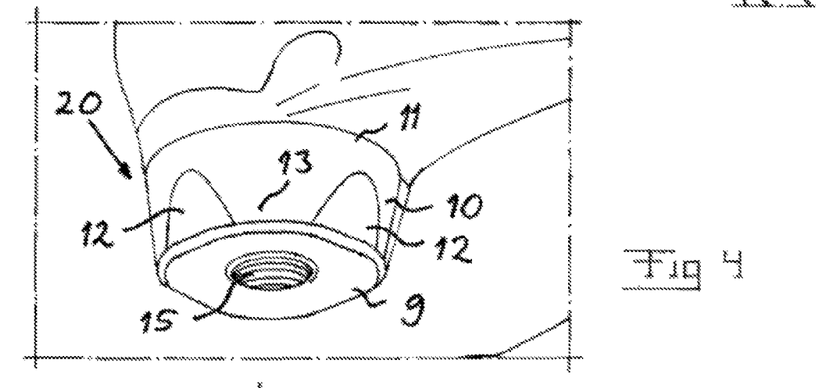
FIG. 4 is a perspective view illustrating a holder member in an insert holder of a cutting tool according to the invention.
Figure 5:
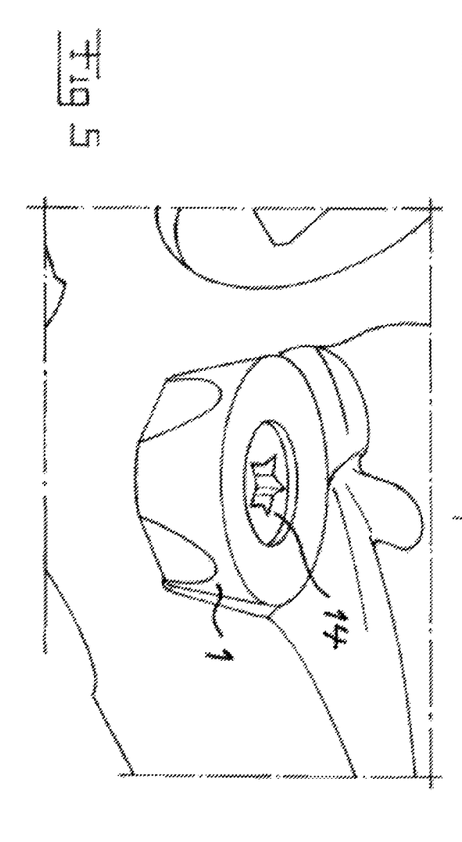
FIG. 5 is a view similar to FIG. 4 with an insert according to FIG. 1 received in and secured to said holder member.
Figure 6:
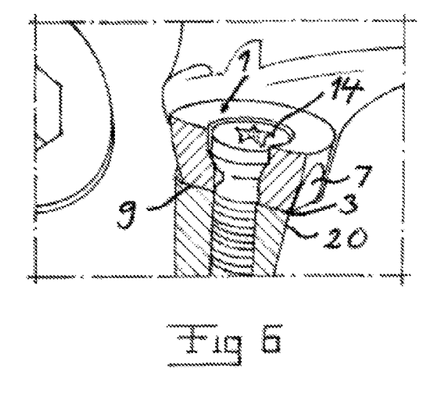
FIG. 6 is a cross-section view of the holder member and insert shown in FIG. 5.

The cutting tool has a holder with several holder members to which inserts according to FIG. 1 are to be secured, and the general construction of such a holder member will now be described while referring to FIG. 3-5. The holder member 20 has a bottom surface 9 forming a seat, a so-called pocket seat, for supporting the bottom surface 3 of the insert and an upstanding wall 10 configured to form a lateral support for the insert. The upstanding holder wall 10 may have a circumferential extension of 90°-270° and has in the present case a circumferential extension of about 150°. The upper part 11 of the upstanding holder wall 10 makes substantially the same angle 90°+A with the bottom surface 9 of the holder member as the angle made by the upper part 6 of the insert clearance surface with the bottom surface 3 of the insert. This means that a tight abutment of the upper part 6 of the insert to the upper part 11 of the holder member may be obtained over the entire circumferential extension of the upstanding holder wall 10 when the insert is secured to the holder.

Furthermore, also the upstanding holder wall 10 has in the lower part thereof two flat lower portions 12 spaced apart at the same circumferential mutual distance as the lower portions 7 of the insert. These lower portions 12 extend over about 71-79% of the vertical extension of the upstanding holder wall 10 and make substantially the same obtuse angle 90°+B with respect to the bottom surface 9 of the holder member as the obtuse angle 90°+B made by the lower portions 7 of the insert with the bottom surface 3 thereof. However, a recess 23 is made in said upstanding holder wall between each said lower portion 12 and the upper part 11, so that a gap 16 is formed between these lower portions. This may for instance be in the order of 0.03 mm. However, the lower portions 12 of the upstanding holder wall are separated by lower upstanding holder wall parts 13 making a smaller obtuse angle with the bottom surface 9 of the holder member than the obtuse angle made by the lower portions of the wall with this bottom surface, and the angle made by the parts 13 is here the same as the angle made by the upper part 11 with the bottom surface 9, i.e. 90°+A.

Figure 7:
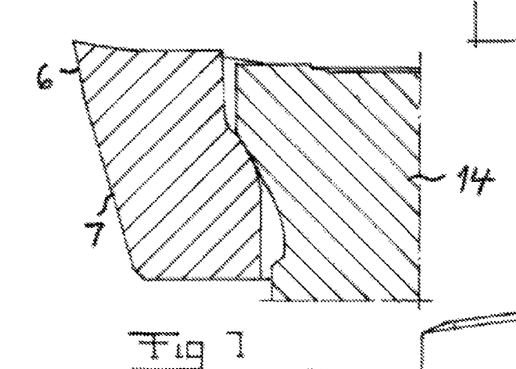
FIG. 7 is a cross-section view illustrating how the insert is secured to the holder member.

The design of the insert and the holder member described above means that the insert may only be secured to the holder in a finite number, namely four, of fixed relative positions, since it is impossible to introduce a screw 14 into the central hole 8 of the insert and into a threaded bore 15 in the bottom surface of the holder member if the lower portions 7 of the insert are not facing the lower portions 12 of the upstanding holder wall. If it is tried to obtain another relative position than these four fixed relative positions the lower parts 21 of the clearance surface separating the lower portions 7 will at least partially face the lower portions 12 of the upstanding holder wall making a larger obtuse angle with said bottom surfaces than said lower part of the insert, so that the central hole 8 of the insert main not be flush with the bore 15. Accordingly, it is impossible to clamp the insert in other than said four positions in said holder member when indexing making such indexing very easy to carry out.

Furthermore, said small gap 16 with no contact (see FIG. 3) between the insert and the holder member between these lower portions in each said fixed position means that larger tolerances may be tolerated when manufacturing the insert and the holder member and still a perfect fit of these with respect to each other may be obtained than would there be no such gap between these lower portions. The presence of this gap also means that it gets easier to obtain a real perfect tight abutment of the upper parts 6 and 11, since there is no need of a perfect match of said lower portions with respect to each other. This perfect fit with a contact area between these upper parts extending over the entire circumferential extension of the upstanding holder wall efficiently prevents chip or dirt to penetrate between said upstanding holder wall and the insert, so that heat dissipation from the insert to the holder member through these upper parts may be very efficient. Such heat is of course also efficiently drained to the holder member through a perfect contact of the bottom surfaces 3 and 9 to each other.

When the portion of the circular cutting edge 5 of the insert has been worn out indexing is carried out by unscrewing the screw 14 so much that the insert may be lifted with the bottom surface 3 thereof above the upper limitation of the lower portions 12 of the upstanding holder wall, whereupon the insert is turned 90° and then lowered in a new said fixed relative position onto the bottom surface 9 of the holder member. The screw 14 is then tightened again for efficiently clamping the insert now indexed by 90° for using another part of the cutting edge 5 for machining.

Figure 8:
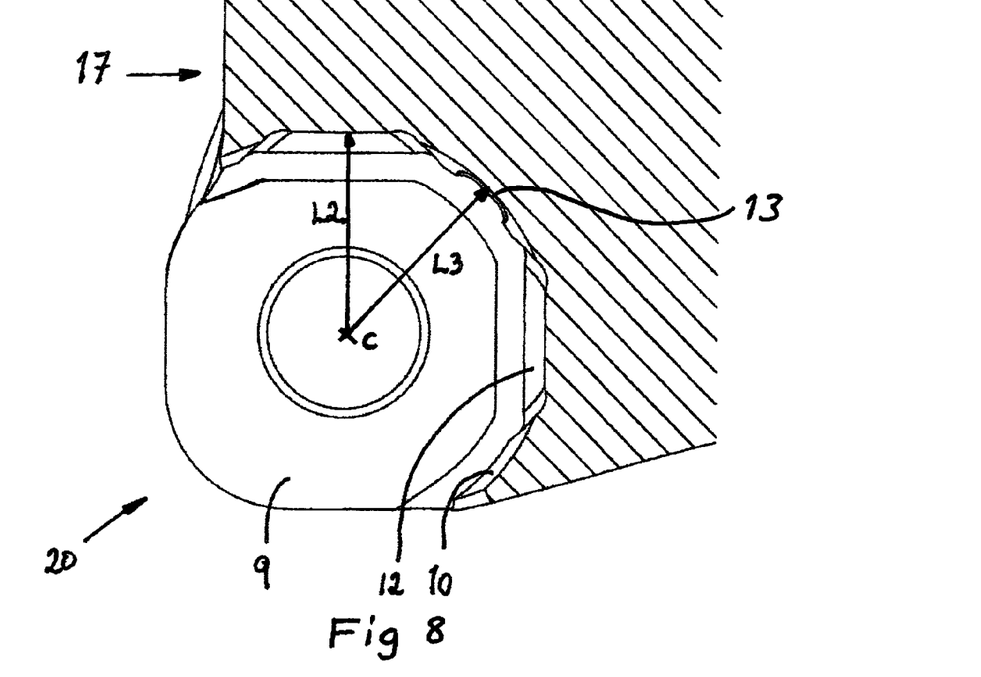
FIG. 8 is a simplified cross-section view of the holder member in a plane P1 above and parallel to the bottom surface of the holder member.
Figure 9:
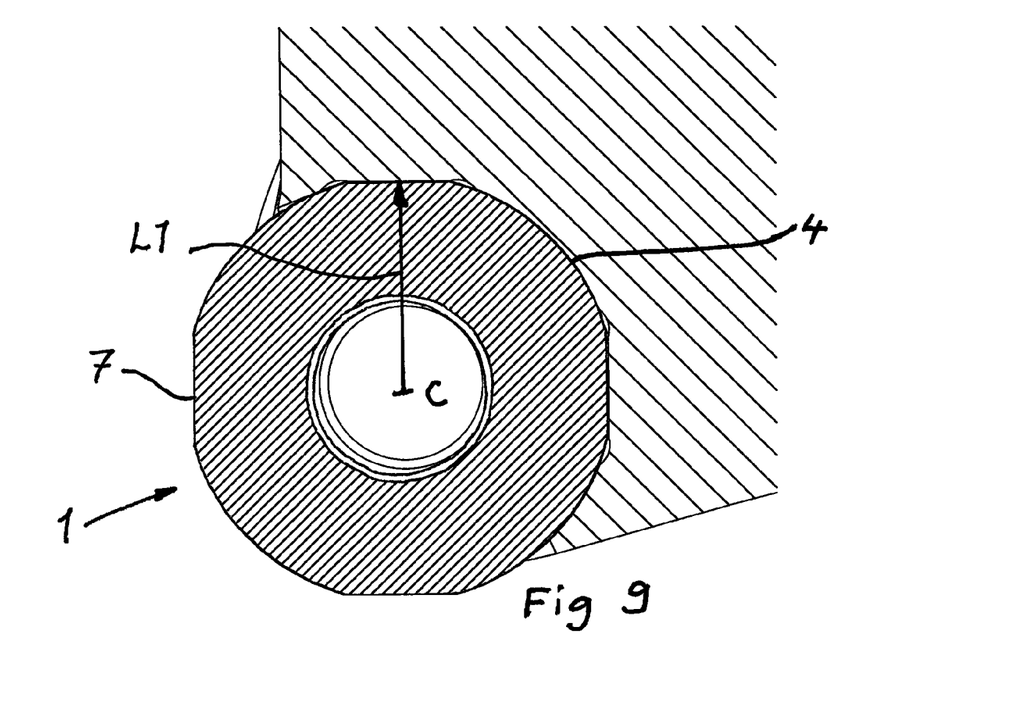
FIG. 9 is a simplified cross-section view of an insert received in said holder member in said plane P1.

FIG. 8 and FIG. 9 are simplified views used to further illustrate and explain the relationship between the upstanding walls of a holder member according to the invention and those of an insert to be received therein. It is shown that for a cross-section in a plane P1 (see FIG. 5) in parallel with the bottom surface 9 of the holder member 20 the following will apply for an insert 1 and a holder member in each said fixed relative position: A first distance L1 between the centre C of the insert and the lower portion 7 of the insert is less than a second distance L2 between said centre C and the lower portion 12 of the holder member, which in its turn is less than a third distance L3 between said centre C and the conical clearance surface 4 and a curved portion 13 of the upstanding holder wall 10 laterally supporting said conical clearance surface.

Figure 10:
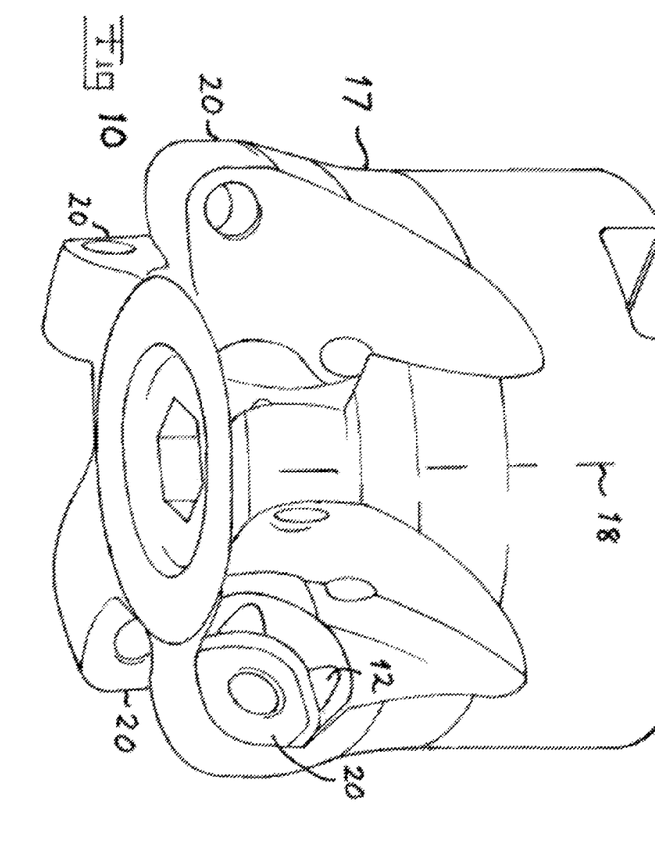
FIG. 10 is a simplified perspective view showing the general construction of a cutting tool according to the present invention.

FIG. 10 illustrates a cutting tool according to the invention to be used for milling and having a plurality, in fact four, of inserts and holder members 20 distributed on the holder 17 around an intended axis of rotation 18 of the holder. However, the inserts are not shown in this figure.

The invention is of course not in any way restricted to the embodiments described above, but many possibilities to modifications thereof would be apparent to a person with ordinary skill in the art without departing from the scope of the invention as defined in the appended claims.

The circumferential extension of the upstanding holder wall of the holder member may be another than shown, and the number of lower portions of the holder wall may be other than two, such as one or even more than two.

The disclosures in Swedish patent application No. 0900587-7, from which this application claims priority, are incorporated herein by reference.

The invention claimed is:

1. A cutting tool comprising:
at least one indexable insert having a top chip breaking surface, a bottom mounting surface and a conical clearance surface extending between the top and bottom surfaces and intersecting the top surface to form therewith a cutting edge with a substantially circular extension, the insert comprising at least one flat lower portion disposed between the top and bottom surfaces such that a cross-section in a plane through the indexable insert parallel to the bottom mounting surface intersects both the flat lower portion and the conical clearance surface, the indexable insert having a center,
a holder comprising at least one holder member having a bottom surface forming a seat for supporting the bottom surface of the insert and an upstanding wall forming part of a cone configured to form a lateral support for the insert, the holder member comprising at least one flat lower portion above the bottom surface such that bordering edges of the holder member when seen in the plane of the insert received in the holder member parallel to the bottom surface contain both the flat lower portion and the upstanding wall, and
means for securing the insert to the holder,
the upstanding holder wall and the insert clearance surface being designed so as to enable securing of the insert to the holder in a finite number of fixed relative positions,
wherein in each relative position in the plane a first distance between the center and the lower portion of the insert is less than a second distance between the center and the lower portion of the holder member, which in turn is less than a third distance between the center and a curved portion of the upstanding wall laterally supporting the conical clearance surface.

2. A cutting tool according to claim 1, wherein an upper part of the upstanding holder wall makes substantially the same angle with the bottom surface of the holder member as an angle made by an upper part of the insert clearance surface with the bottom surface of the insert for tight abutment of the upper part of the insert to the upper part of the holder member over the entire circumferential extension of the upstanding holder wall when the insert is secured to the holder.

3. A cutting tool according to claim 1, wherein the upper part of the upstanding holder wall extends over 10-50% of the vertical extension of the upstanding holder wall from a top thereof to the bottom surface.

4. A cutting tool according to claim 1, wherein the upstanding holder wall has a circumferential, extension of 90°-270°.

5. A cutting tool according to claim 1, wherein it comprises a plurality of the inserts and holder members distributed on the holder around an intended axis of rotation of the holder.

6. A cutting tool comprising:
at least one indexable insert having a top chip breaking surface, a bottom mounting surface and a conical clearance surface extending between the top and bottom surfaces and intersecting the top surface to form therewith a cutting edge with a substantially circular extension, the insert comprising at least one flat lower portion disposed between the top and bottom surfaces such that a cross-section in a plane through the indexable insert parallel to the bottom mounting surface intersects both the flat lower portion and the conical clearance surface, the indexable insert having a center,
a holder comprising at least one holder member having a bottom surface forming a seat for supporting the bottom surface of the insert and an upstanding wall forming part of a cone configured to form a lateral support for the insert, the holder member comprising at least one flat lower portion above the bottom surface such that bordering edges of the holder member when seen in the plane of the insert received in the holder member parallel to the bottom surface contain both the flat lower portion and the upstanding wall, and
means for securing the insert to the holder,
the upstanding holder wall and the insert clearance surface being designed so as to enable securing of the insert to the holder in a finite number of fixed relative positions,
wherein in each relative position in the plane a first distance between the center and the lower portion of the insert is less than a second distance between the center and the lower portion of the holder member, which in turn is less than a third distance between the center and a curved portion of the upstanding wall laterally supporting the conical clearance surface, and wherein the holder member is configured to receive the insert with the at least one lower portion of the upstanding holder wall facing the at least one lower portion of the insert clearance surface in each the fixed relative position, and the at least one lower portion of the upstanding holder wall and the at least one lower portion of the insert clearance surface are designed to have a gap therebetween over the entire extension of these lower portions when the upper part of the insert clearance surface bears tightly upon the upper part of the upstanding holder wall and these lower portions are facing each other in each fixed relative position.

7. A cutting tool according to claim 6, wherein the at least one lower portion of the upstanding holder wall makes a smaller obtuse angle with respect to the bottom surface of the holder member then the obtuse angle made by the at least one lower portion of the insert clearance surface so as to define the gap, and the difference the obtuse angles made by the at least one lower portion of the upstanding holder wall with the bottom surface of the holder and the at least one lower portion of the insert clearance surface with the bottom surface of the insert is 1°-20°.

8. A cutting tool according to claim 6, wherein the at least one lower portion of the upstanding holder wall extends over a restricted part of the circumferential extension of the upstanding holder wall, and the insert has a plurality of the lower portions spaced apart over the circumferential extension of the insert clearance surface and each extending over a corresponding restricted part of the circumferential extension of the insert clearance surface so as to define the fixed relative positions when facing the at least one lower portion of the upstanding holder wall for indexing between such positions.

9. A cutting tool according to claim 6, wherein the at least one lower portion of the upstanding holder wall makes a larger obtuse angle with the bottom surface of the holder than made by the upper part of the upstanding holder wall with this bottom surface.

10. A cutting tool according to claim 6, wherein the upstanding holder wall has more than one the lower portion, and the mutual angular spacing of these lower portions is the same as a mutual angular spacing of corresponding lower portions in the lower part of the insert clearance surface.

11. A cutting tool according to claim 10, wherein the lower portions of the upstanding holder wall are separated by lower upstanding holder wall parts making a smaller obtuse angle with the bottom surface of the holder member than the obtuse angle made by the lower portions of that wall with the bottom surface, and the lower portions of the insert are separated by a lower insert clearance surface part making a smaller obtuse angle with the bottom surface of the insert than made by the lower portions of the insert with this bottom surface.

12. A cutting tool according to claim 6, wherein the lower portions of the insert are separated by a lower insert clearance surface part making a smaller obtuse angle with the bottom surface of the insert than an obtuse angle made by the at least one lower portion of the upstanding holder wall with the bottom surface of the holder member.

13. A cutting tool according to claim 6, wherein the lower portions of the upstanding holder wall and of the insert clearance surface are flat.

14. A cutting tool according to claim 6, wherein the upstanding holder wall has two lower portions.

15. A cutting tool according to claim 6, wherein the insert has 2, 3, 4, 5, 6, 7 or 8 lower portions of the insert clearance surface.

16. An insert holder for holding at least one insert in a cutting tool, the cutting tool comprising at least one indexable insert having a top chip breaking surface, a bottom mounting surface and a conical clearance surface extending between the top and bottom surfaces and intersecting the top surface to form therewith a cutting edge with a substantially circular extension, the insert comprising at least one flat lower portion disposed between the top and bottom surfaces such that a cross-section in a plane through the indexable insert parallel to the bottom mounting surface intersects both the flat lower portion and the conical clearance surface, the indexable insert having a center, the holder comprising at least one holder member having a bottom surface forming a seat for supporting the bottom surface of the insert and an upstanding wall forming part of a cone configured to form a lateral support for the insert, the holder member comprising at least one flat lower portion above the bottom surface such that bordering edges of the holder member when seen in the plane of the insert received in the holder member parallel to the bottom surface contain both the flat lower portion and the upstanding wall, and means for securing the insert to the holder, the upstanding holder wall and the insert clearance surface being designed so as to enable securing of the insert to the holder in a finite number of fixed relative positions, wherein in each relative position in the plane a first distance between the center and the lower portion of the insert is less than a second distance between the center and the lower portion of the holder member, which in turn is less than a third distance between the center and a curved portion of the upstanding wall laterally supporting the conical clearance surface.

* * * * *